Sept. 3, 1935.  W. L. MARDEN  2,013,184
FLUID STORAGE AND METERING SYSTEM
Filed March 31, 1933  2 Sheets-Sheet 1
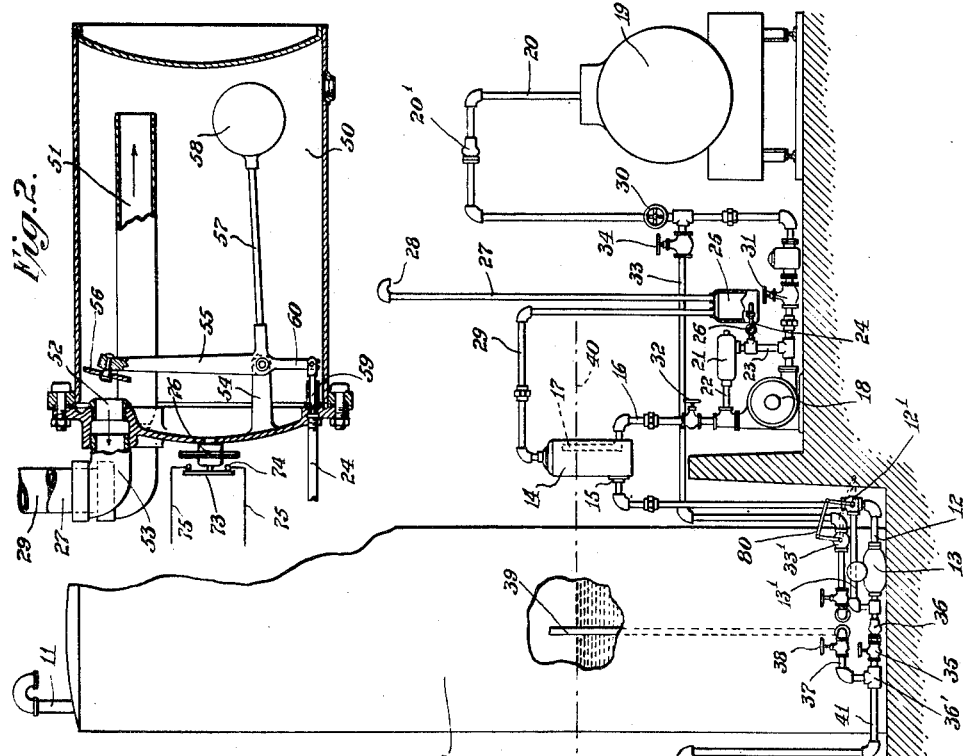
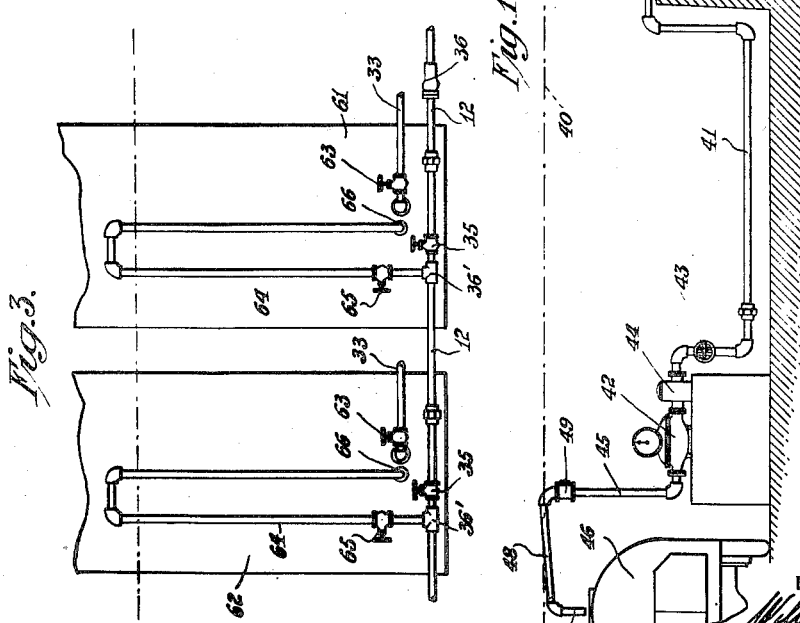
INVENTOR
William L. Marden
ATTORNEYS

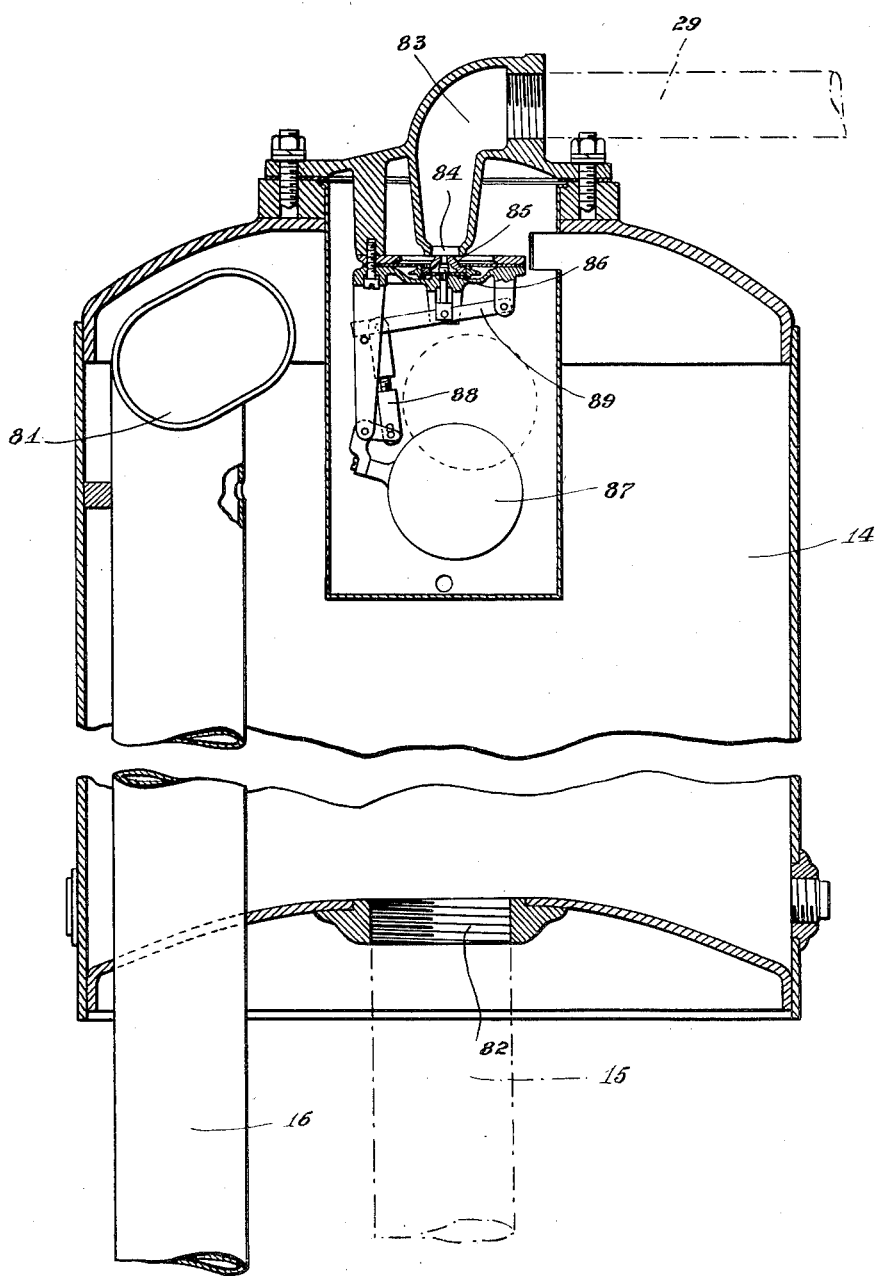

Patented Sept. 3, 1935

2,013,184

UNITED STATES PATENT OFFICE 2,013,184

FLUID STORAGE AND METERING SYSTEM

William L. Marden, Jackson Heights, N. Y., assignor to Neptune Meter Company, New York, N. Y., a corporation of New Jersey Application March 31, 1933, Serial No. 663,768

3 Claims. (Cl. 137—78)

The present invention relates to fluid storage and metering systems and embodies, more specifically, an apparatus by means of which fluid may be received from a suitable fluid source and stored in receptacles from which the same may be discharged from time to time as occasion demands. More particularly, the invention embodies an improved fluid storage device wherein the quantity of fluid received by the device and the quantities dispensed from time to time may be accurately determined, the mechanism being of such character as to insure accurate registration of the true quantities of fluid received and dispensed by the device.

In fluid storage and metering systems now in use, it has been found that definite losses occur due to the evaporation of the liquids incident to their transfer and metering particularly where the liquids are volatile or semi-volatile. It is furthermore known that, during the operation of transferring the liquid from a supply source to storage tanks, air and/or gas may be entrained in the liquid and cause inaccuracies in the metering of the volume of the liquid received and dispensed.

It is an object of the present invention to provide a fluid storage and metering system of such character that metering of the fluid received by the system and dispensed thereby may be accurately effected.

A further object of the invention is to provide a fluid storage and metering apparatus wherein the evaporation losses therefore occurring during the transfer and metering of the liquids is substantially eliminated.

A further object of the invention is to provide an improved apparatus for storing and metering liquids wherein means is provided for delivering liquid to storage receptacles from a liquid source, the liquid being substantially free from entrained fluids, such as air or gas.

A further object of the invention is to provide a system by means of which liquids may be received by one or a plurality of storage receptacles, means being provided to remove, effectively, entrained fluids in the liquid delivered to the receptacles and further means being provided to enable the liquid to be dispensed from one or more of the storage receptacles without disturbing the contents of other storage receptacles constituting the storage system.

Further objects, not specifically enumerated above, will be apparent as the invention is described in greater detail in connection with the accompanying drawings, wherein:

Figure 1 is a view in front elevation showing a liquid storage and metering system constructed in accordance with the present invention, the view illustrating the mechanism by means of which an accurate metering of the liquid is obtained without giving rise to substantial losses due to evaporation thereof during the transfer and metering operations.

Figure 2 is an enlarged detail view in section showing a modified form of fluid trap which may be used in connection with the storage and metering apparatus illustrated in Figure 1, this device serving to reduce the evaporation during the transfer and metering operations.

Figure 3 is a detail view of a modified form of the apparatus showing its adaptation to a fluid storage system wherein a plurality of storage receptacles are utilized.

Figure 4 is a detail view showing a modified and preferred form of air release tank for use in connection with the present invention.

With reference to the apparatus shown in Figure 1, the fluid system will be seen to include a storage tank 10 provided with a vent cap 11 at the top thereof. The storage tank is supplied with fluid through a pipe 12 within which a meter 13 of suitable form is connected. Pipe 12 communicates with an air release tank 14 through a connection 15 adjacent the bottom thereof, the air release tank receiving liquid from a pipe 16. In the form shown in Figure 1, the pipe 16 is formed with an extension 17 which terminates adjacent the top of tank 14. Pipe 16 receives liquid from a pump 18.

Liquid may be supplied to the storage tank 10 from suitable sources, in the present construction, a tank car 19 being illustrated as a liquid source and the liquid as pumped from the car 19 through a pipe connection 20 which communicates with the inlet chamber of the pump 18. A check valve 20' is installed in the pipe connection 20 to prevent discharge of the contents of tank 10 back into the car if valves 30 and 34 are simultaneously left open.

If the pump has no built-in by-pass available, a relief valve 21 is provided, the relief valve communicating with the pressure side of the pump through a pipe 22 and with the suction side of the pump through a pipe 23. The relief valve is formed at least as large as the pump discharge pipe 16 to accommodate the fluid pumped under all conditions.

Communicating with pipe 23 through a connection 24 is an auxiliary tank 25 which serves as a trap to collect any liquid which may be discharged from the air release tank 14. A valve 26 is provided in the connection 24 to enable the auxiliary tank 25 to be drained into the pipe 23 and a vertical vent pipe 27 is connected to the upper portion of the trap or tank 25 in order that air and gas may be discharged from the trap. A vent cap 28 of proper form is secured to the upper extremity of pipe 27 and the height of pipe 27 is as great as possible.

Connecting the upper portions of tank 14 and trap 25 is a pipe 29 to direct fluids from the tank 14 to the trap 25 prior to effecting the discharge thereof into the atmosphere. The flow of fluid through the pipes discussed in connection with the pump, air release tank, and liquid trap 25 is preferably controlled by means of valves 30, 31, and 32. Valve 30 controls the flow of fluid through the supply pipe 20 to the apparatus, valve 31 further controlling the fluid flow to the suction side of pump 18 while the valve 32 controls the fluid flow from the pressure side of the pump. A by-pass pipe connection 33 is provided between the pipe 20 and the storage tank 10, a valve 34 being provided in this pipe line to control the fluid flow therethrough. To control the fluid flow from pipe 12 to the storage tank, a manually operated valve 35 is provided, as well as a check valve 36 of suitable form. Valve 35 communicates with the storage tank through a fitting 36', connection 37 and manually controlled valve 38, connection 37 terminating in an extension 39 which passes upwardly into the tank 10 and terminates above the maximum discharge elevation as indicated by the dot and dash line 40. This elevation represents the highest point in the discharge line at which fluid flows from the storage tank 10.

In order that fluid may be dispensed from the storage tank 10, a pipe 41 is shown as connected with fitting 36' and a meter 42. A manually operated valve 43 is provided in the pipe line 41 and a suitable sediment trap 44 may be provided to prevent the introduction of sediment into the meter 42. From the meter 42 a pipe 45 directs fluid to a suitable receptacle 46, in this instance, being shown as a tank truck. Pipe 45 terminates in a spout 47 which is connected thereto through a pipe section 48 having a downward pitch and a valve 49 which preferably is of the slow closing type.

In order that the storage tank 10 may be connected to the pump suction through pipe connection 33, a valve 33' is installed in the connection 33 and a valve 12' in the pipe connection 12. A by-pass pipe 13' is provided to afford a by-pass connection around meter 13 being connected to the valve 12'. The handles of valves 12' and 33' are interconnected by means of a link 80. With valve 33' open, valve 12' is so connected that the meter 13 is by-passed and fluid may be pumped from the tank 10 without passing through the meter 13. With the valve 33' closed, valve 12' connects the meter 13 with the discharge side of the pump.

In place of the trap 25, a modified form of trap may be utilized, this modified form being illustrated in Figure 2 wherein 50 illustrates the tank or trap within which an extension 51 is provided in the upper portion thereof, the extension being connected to the pipe 29. In order that fluid may be introduced thereinto from the air release tank 14. A valve seat 52 is formed adjacent the upper portion of the tank and communicates through a fitting 53 with the vent pipe 27. Upon a suitable bracket 54, within the trap 50, is journaled an arm 55 upon the extremity of which a valve 56 is provided, this valve being adapted to engage the seat 52 to close the same upon predetermined conditions. The arm 55 is formed with an angular extension 57, upon the end of which a float 58 is provided, the float 58 thus serving to close valve 56 when the liquid level within the trap 50 reaches a predetermined height. The contents of the trap 50 may be drained through connection 24 by means of a float control valve 59 which is actuated by an arm 60, adapted to be actuated by the float 58. The foregoing construction serves as a means for automatically draining the trap when a predetermined volume of liquid exists therein, the means being of such character as to prevent the introduction of air into the pipe 24. In order that the electrical circuit of the motor which drives pump 18 may be broken in the event of the discharge of liquid into the trap at a rate greater than the same may be drained through pipe 24, a pressure operated switch is provided, the switch consisting of a movable contact member 73 which is adapted normally to engage contacts 74 in the circuit 75 of the pump motor. A suitable pressure responsive member 76 communicates with the trap and, upon a predetermined increase of pressure therein, moves the switch member 73 away from contact 74 to break the motor circuit.

In the construction shown in Figure 3, a plurality of tanks are shown, forming a bank of storage receptacles connected in multiple and adapted to receive liquid from the pump and meter system previously described and to discharge quantities thereof in a predetermined fashion. In this construction, the pipe 12 communicates with all of the tanks 61, 62, etc., the pipe 12 being provided with such fittings as to adapt it to deliver liquids to the tanks in a predetermined fashion. The pipe 33 is likewise connected to all of the containers through suitable connections, valves 63 being provided in the pipe 33 adjacent each tank. A valve 35 is provided in the pipe line 12, in advance of the connection communicating between the pipe line 12 and the respective tank 61, 62, etc. This connection in the construction shown in Figure 3 comprises a loop section 64 provided with a manually operated valve 65 and communicating with the respective tanks at 66.

Figure 4 shows a preferred form of air release tank for use in connection with the present invention in place of the air release tank illustrated in Figure 1. This air release tank construction is shown and described in detail in applicant's copending application Ser. No. 661,232 filed March 17, 1933 for Air release tanks. Briefly, the air release tank comprises an inlet connection 81 which is connected with pipe 16 and an outlet connection 82 which is connected with pipe 15. The air release or vent pipe 29 is connected with an outlet connection 83 which communicates with the interior of chamber 14 through a valve port 84. Valve port 84 is adapted to be closed by means of a valve 85 the valve 85 being provided with a pilot valve 86 which is connected to a float 87 through links 88 and 89. Initial movement of the float 87 upwardly closes the pilot valve 86 and subsequently advances the main valve 85 into engagement with port 84. In as much as this specific air release tank construction does not constitute a part of the present invention, further description of the details thereof is unnecessary herein, reference being made to applicant's copending application therefor.

In operation, the foregoing apparatus functions as follows. Liquid is supplied to the storage tanks from a suitable source, such as a tank car through pipe 20. Obviously, this liquid source may consist of a pipe line or other device. The pump 18 directs the liquid into the storage tank 10 in the construction shown in Figure 1 and to separate air which is frequently entrained in the liquid during such operation the air release tank 14 is provided, the liquid being pumped into this tank prior to introduction into the storage tank. By separating the air from the liquid prior to introducing the liquid into the storage tank, substantial losses due to evaporation are prevented. In existing constructions, this entrained air has been pumped into the storage tank with the liquid and while rising through the liquid carries with it volatile portions thereof.

By directing the liquid through the air release tank 14 air and gas entrained therein are separated and discharged through pipe 29. A certain amount of entrained liquid or vapor is present in this discharged air and the trap 25 is therefore provided to recover the same. Whether the trap is of the form illustrated in Figure 1 or of the form illustrated in Figure 2, the liquid is accumulated therein and returned to the suction side of the pump. If of the form illustrated in Figure 1, the liquid is drained from the trap by means of the hand operated valve 26 while, if of the form illustrated in Figure 2, the float valve 59 automatically returns such liquid to the suction side of the pump at the same time preventing air and gas from being drawn through the connection 24. The air present in the trap 25 is vented to the atmosphere through vent pipe 27. The form of trap shown in Figure 2 not only automatically controls the flow of liquid through the return pipe 24 but, by means of valve 52, the air discharge or vent pipe 27 is automatically shut off from the interior of the trap in case the liquid level therein rises faster than the suction can drain the tank. This condition might arise by reason of the failure of the float valve mechanism in the main air release tank 14, thus allowing the pump pressure to force the liquid through the vent pipe into the trap. In order that such condition may be promptly relieved, the head of the tank of the trap is provided with a pressure operated switch which is connected in the circuit of the motor driving pump 18. When the pressure within the trap reaches a predetermined degree, the switch is actuated to break the motor circuit and the pump shuts down the system. In such condition, the float actuated valve 56 prevents the liquid from being discharged from the vent pipe 27 into the atmosphere.

In case the liquid supply fails, air only will be pumped into the release tank 14. To prevent this air from being blown through the line to the supply tank, the check valve 36 is provided, the valve being designed so that it will not open under pressures below 3 or 4 pounds per sq. inch. This pressure is sufficient to force the air out of the air release tank and through the trap and vent pipe 27. The meter 13 is installed between the air release tank 14 and the supply tank, thus accurately metering the quantity of liquid delivered to the supply tank in as much as all air is eliminated therefrom by the air release tank.

The meter 42 being installed in the discharge line 41, measures the quantity of liquid dispensed from the storage tank. The connection of the discharge pipe 41 to the storage tank is made at a point where the discharge line from the air release tank 14 enters the storage tank. This permits the discharge of liquid from the storage tank either by gravity or by means of the pump. In the event that the pump is utilized, the pump suction is taken from a pipe line 33, which is connected to the storage tank through a separate connection. It is also possible to utilize as the suction supply for the pump, liquid taken directly from the supply pipe 20. In any event, all air will be eliminated from the liquid before passing through the outgoing meter.

In order that the accurate reading of the meter 42 may be insured under all conditions, it is necessary that the meter and its associated piping always be maintained full of liquid. In order that this may be accomplished under all conditions of operation, the discharge pipe from the meter is carried to an elevation higher than the meter and a shut-off valve installed at the high point. This valve is shown at 49 and prevents draining of the meter from the discharge side. It is further desirable that the inlet pipe to the air release tank be carried up inside the tank and that the tank itself be at such an elevation that the top of the inlet pipe is above the level of the meter discharge. In this fashion, draining of liquid from the meter is prevented should a slight leak in the air vent of the air release tank exist. Such a leak would permit liquid to enter the vent line and if the air release tank were at a lower level than the meter discharge, liquid would be drained from the meter.

To prevent liquid from draining back into the main storage tank from the meter when the tanks are empty the connection to the tank from the air release tank is preferably made at a point above the meter discharge opening. This is illustrated by the pipe 29 which is shown as extending above the level 40 which is the level of the meter discharge opening.

In the construction shown in Figure 3, wherein a plurality of tanks are used, the connections between the air release tank and the respective storage tanks include loops formed therein to prevent liquid in the meter from being drained back into the storage tanks.

While the invention has been described with specific reference to the accompanying drawings, it is not to be limited, save as defined in the appended claims.

I claim as my invention:

1. A liquid storage and metering system comprising a storage receptacle, a supply line connected therewith, a discharge line connected therewith, a flow creating means in the supply line, an air release device in the supply line, a meter in the discharge line, the discharge line being formed with an outlet above the elevation of the meter, and the air release device being at an elevation above that of the meter whereby a condition of hydraulic equilibrium will be established when the system is not operating.

2. A liquid storage and metering system comprising a storage receptacle, a supply line connected therewith, a discharge line connected therewith, a flow creating means in the supply line, an air release device in the supply line, means to collect liquid vented from the air release device, means to return the collected liquid to the supply line, and means controlled by the pressure within the collecting means to control the flow creating means.

3. A liquid storage and metering system comprising a plurality of storage receptacles, a supply line, a discharge line, loops connecting the supply and discharge lines with the respective receptacles, said loops extending above the greatest elevation of the discharge line, an air release device in the supply line, a meter in the discharge line, and means in the discharge line on the discharge side of the meter for preventing a reversal of flow through the meter.

WILLIAM L. MARDEN.